(12) United States Patent
Ziebert et al.

(10) Patent No.: US 8,960,708 B2
(45) Date of Patent: Feb. 24, 2015

(54) ENCLOSURE GUIDE SYSTEM FOR A TOWABLE GENERATOR

(71) Applicant: Kohler Co., Kohler, WI (US)

(72) Inventors: Joshua Ziebert, Fond du Lac, WI (US); Dawn Vertz, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 29 days.

(21) Appl. No.: 13/690,491

(22) Filed: Nov. 30, 2012

(65) Prior Publication Data

US 2014/0151980 A1 Jun. 5, 2014

(51) Int. Cl.
*F02B 63/04* (2006.01)
*H02K 5/00* (2006.01)
*B62D 63/06* (2006.01)

(52) U.S. Cl.
CPC *H02K 5/00* (2013.01); *B62D 63/06* (2013.01); *F02B 63/044* (2013.01)
USPC ............ 280/504; 123/2; 123/3; 123/559.1; 123/41.42; 290/1 A; 290/1 B

(58) Field of Classification Search
USPC ........ 290/1 A, 1 B; 280/504; 123/2, 3, 559.1, 123/41.42
See application file for complete search history.

(56) References Cited

U.S. PATENT DOCUMENTS

| | | | |
|---|---|---|---|
| 4,056,247 A | 11/1977 | Bernard et al. | |
| 4,117,342 A | 9/1978 | Melley, Jr. | |
| 4,136,432 A * | 1/1979 | Melley, Jr. | 29/469 |
| 4,595,841 A | 6/1986 | Yaguchi | |
| 4,835,405 A * | 5/1989 | Clancey et al. | 290/1 A |
| 4,859,886 A | 8/1989 | Tanaka | |
| 4,914,343 A | 4/1990 | Kagawa et al. | |
| 5,253,891 A * | 10/1993 | Carlin et al. | 280/422 |
| 5,433,175 A | 7/1995 | Hughes et al. | |
| 5,550,333 A * | 8/1996 | Whiteman, Jr. | 181/204 |
| 5,624,589 A * | 4/1997 | Latvis et al. | 219/133 |
| 5,734,148 A * | 3/1998 | Latvis et al. | 219/133 |
| 6,091,160 A | 7/2000 | Kouchi et al. | |
| 6,100,599 A | 8/2000 | Kouchi et al. | |
| 6,124,567 A * | 9/2000 | Feldhausen et al. | 219/130.1 |

(Continued)

FOREIGN PATENT DOCUMENTS

EP 1146212 A2 10/2001
EP 1296040 A1 3/2003

(Continued)

OTHER PUBLICATIONS

European Application Serial No. 13188519.6, European Search Report maild Feb. 11, 2014, 6 pgs.

*Primary Examiner* — Kevin Hurley
*Assistant Examiner* — Michael Stabley
(74) *Attorney, Agent, or Firm* — Schwegman Lundberg & Woessner, P.A.

(57) ABSTRACT

Some embodiments relate to an example towable power generation system. The towable power generation system includes a guide that facilitates mounting the enclosure onto a base. In some embodiments, the guide is attached to the enclosure. When enclosure is mounted on the towable power generation system, the guide on the enclosure engages another portion of the towable power generation system as the enclosure is assembled onto (or removed from) the rest of towable power generation system. The guide facilitates alignment and mounting of the enclosure relative to the towable power generation system.

17 Claims, 18 Drawing Sheets

(56) References Cited

U.S. PATENT DOCUMENTS

| | | |
|---|---|---|
| 6,601,542 B2 | 8/2003 | Campion |
| 6,805,462 B1 * | 10/2004 | Smith et al. .................... 362/192 |
| 6,877,581 B2 | 4/2005 | Badr et al. |
| 6,917,121 B2 * | 7/2005 | Akimoto et al. .............. 290/1 A |
| 7,034,414 B1 | 4/2006 | Foerg et al. |
| 7,049,707 B2 | 5/2006 | Wurtele |
| 7,081,682 B2 | 7/2006 | Campion |
| 7,146,962 B2 | 12/2006 | Sugimoto et al. |
| D546,770 S | 7/2007 | Herbstritt |
| 7,245,032 B2 | 7/2007 | Willets et al. |
| 7,436,079 B2 | 10/2008 | Meyers et al. |
| 7,499,263 B2 | 3/2009 | Herbstritt et al. |
| 7,543,793 B2 * | 6/2009 | Graham et al. ............... 248/639 |
| 7,615,877 B2 | 11/2009 | Willets et al. |
| 7,642,665 B2 | 1/2010 | Konop |
| 7,669,325 B2 * | 3/2010 | Husted et al. .............. 29/888.02 |
| 7,699,027 B2 | 4/2010 | Ma |
| 7,739,997 B2 | 6/2010 | Leisner |
| D630,581 S | 1/2011 | Xu et al. |
| 7,902,705 B2 | 3/2011 | Gravlin et al. |
| 8,123,237 B2 | 2/2012 | Takemura |
| 8,143,755 B2 | 3/2012 | Gravlin et al. |
| 8,567,354 B2 * | 10/2013 | Kealy et al. ........................ 123/2 |
| 8,593,002 B2 * | 11/2013 | Hamm et al. ................. 290/1 A |
| 8,723,346 B2 * | 5/2014 | Hamm et al. ................. 290/1 A |
| 2005/0046191 A1 | 3/2005 | Cole et al. |
| 2005/0151374 A1 * | 7/2005 | Ambrose ...................... 290/1 A |
| 2006/0037954 A1 * | 2/2006 | Silvestro ....................... 219/133 |
| 2006/0144637 A1 | 7/2006 | Swartz et al. |
| 2007/0296223 A1 * | 12/2007 | Saylor ........................... 290/1 R |
| 2008/0042625 A1 * | 2/2008 | Konop et al. ..................... 322/1 |
| 2008/0265678 A1 | 10/2008 | Brotto et al. |
| 2010/0072757 A1 | 3/2010 | Kealy et al. |
| 2010/0192908 A1 | 8/2010 | Hunter |
| 2010/0320774 A1 | 12/2010 | Bindhammer |
| 2011/0084498 A1 | 4/2011 | Lemus |
| 2011/0089911 A1 * | 4/2011 | Loisel et al. ..................... 322/88 |

FOREIGN PATENT DOCUMENTS

| | | |
|---|---|---|
| EP | 2138685 A1 | 12/2009 |
| WO | WO-85/03546 A1 | 8/1985 |

* cited by examiner

US 8,960,708 B2

ENCLOSURE GUIDE SYSTEM FOR A TOWABLE GENERATOR

TECHNICAL FIELD

Embodiments pertain to a towable generator, and more particularly to an enclosure guide system for a towable generator.

BACKGROUND

Existing towable generators are typically used to provide temporary power at remote locations. As examples, such towable generators may be used to provide power at construction sites, emergency response sites or other locations that do not have ready access to utility power.

The generators are typically mounted on a trailer in order to move the towable generator from/to a remote location. Conventional towable generators include some form of electric generator.

One common type of electric generator includes an internal combustion engine that drives an electrical alternator to produce alternating electricity. The internal combustion engine and the electrical alternator are typically housed inside an enclosure that protects the internal combustion engine and the electrical alternator from the environment where the towable generator is located (or traveling through).

DETAILED DESCRIPTION

Figure 1:
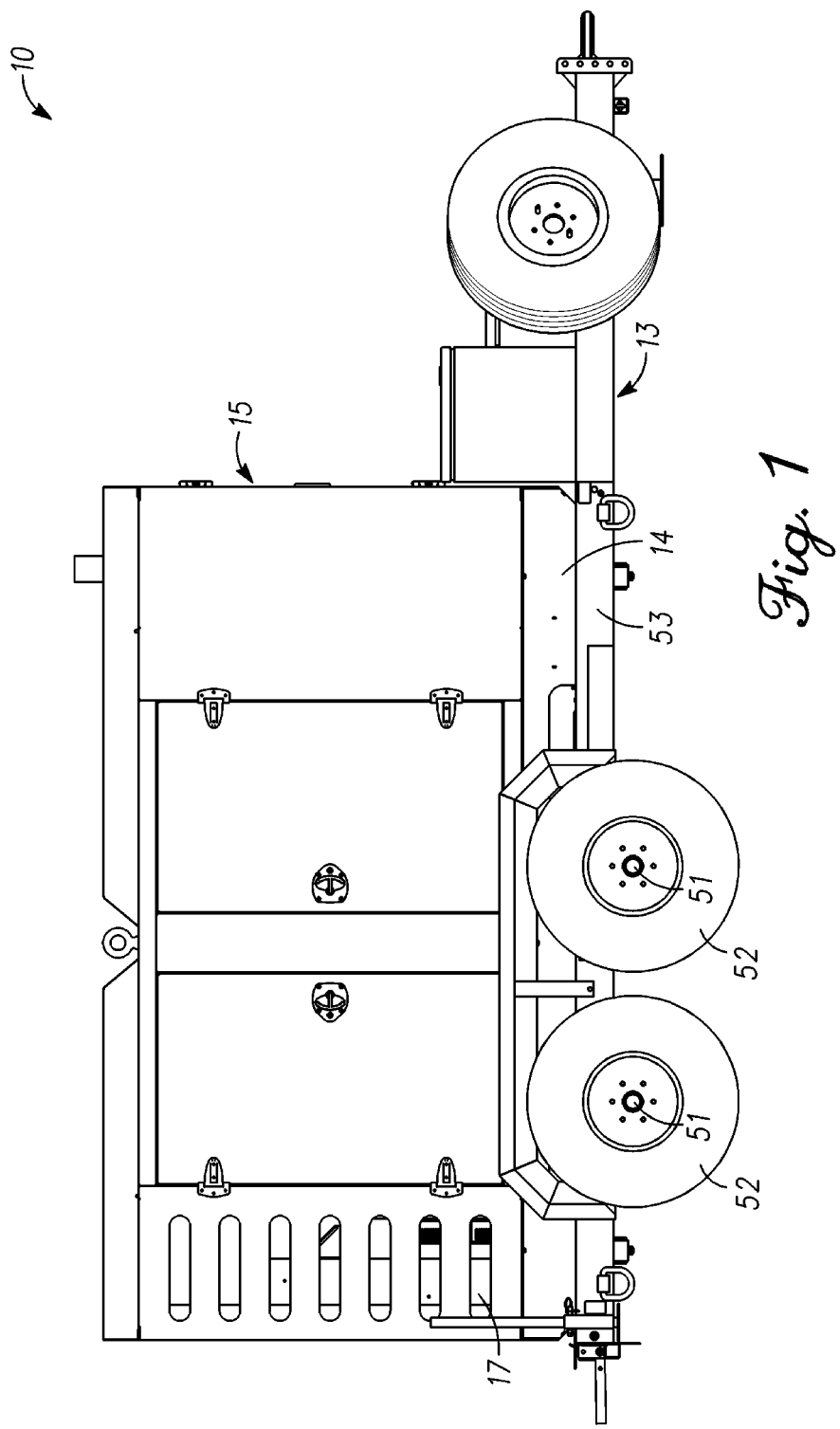
FIG. 1 is a side view illustrating an example towable power generation system.
Figure 2:
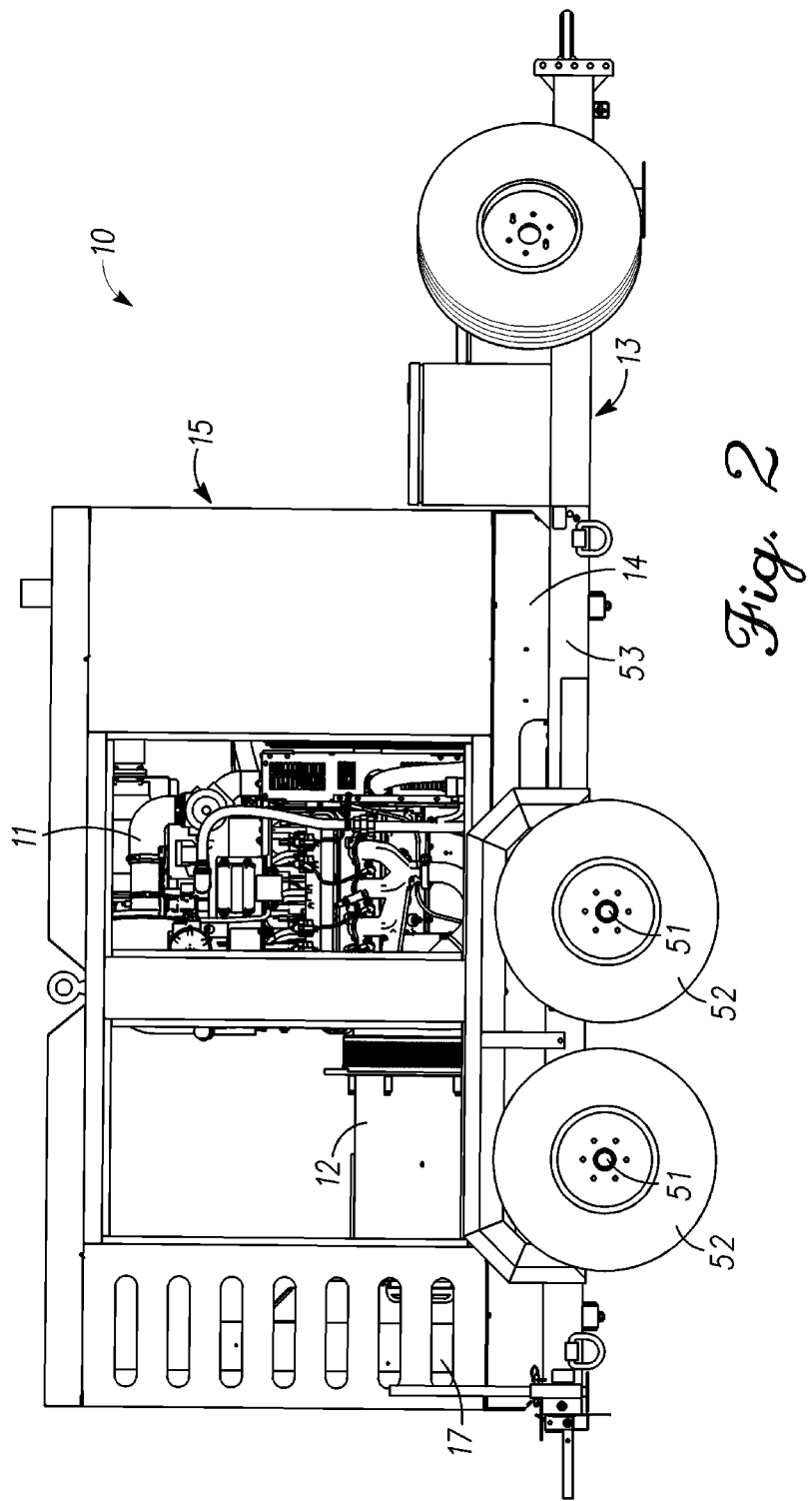
FIG. 2 is a side view of the example towable power generation system shown in FIG. 1 where an enclosure is opened to expose the components inside the enclosure.
Figure 3:
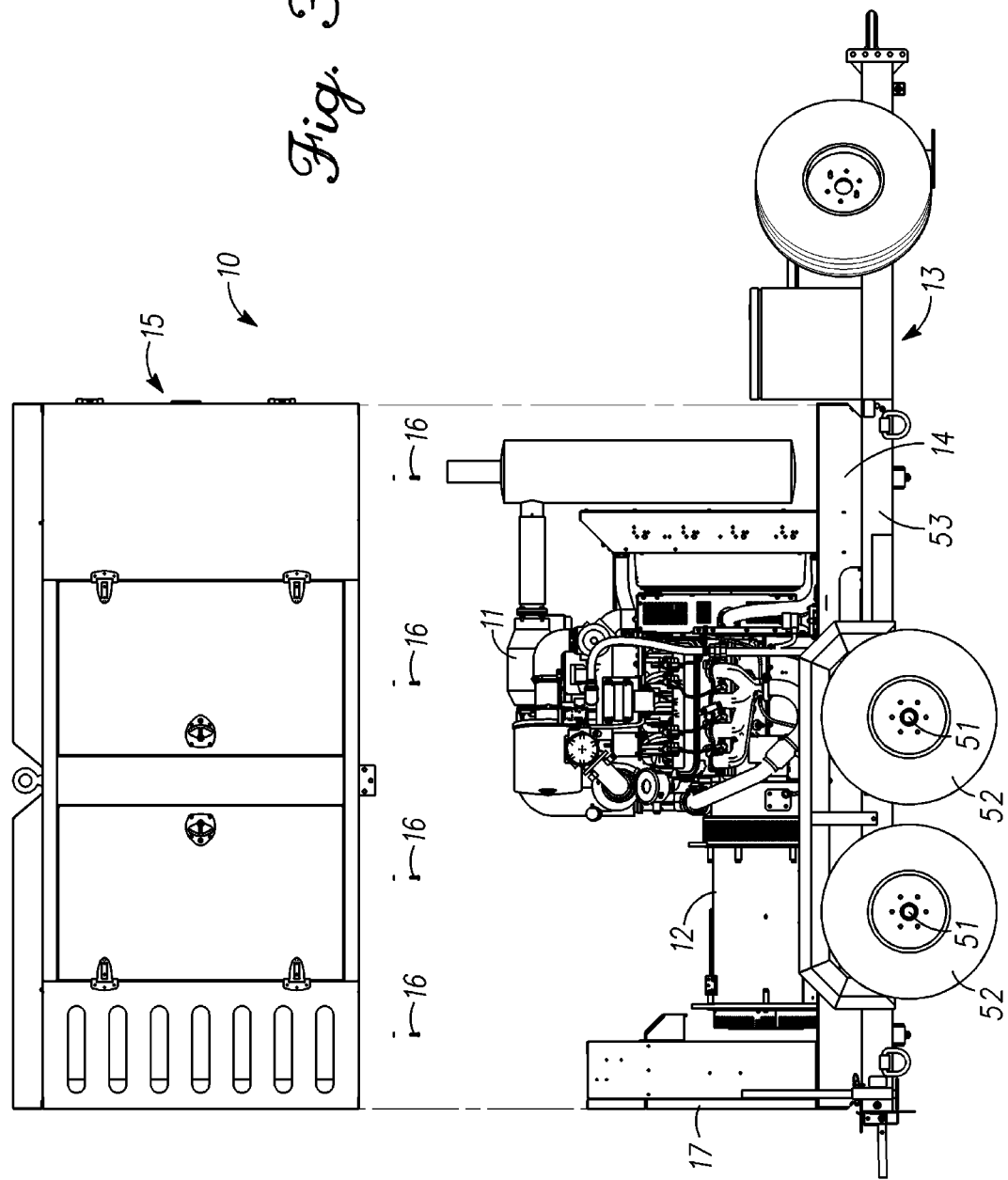
FIG. 3 is an exploded side view of the example towable power generation system shown in FIG. 1.
Figure 4:
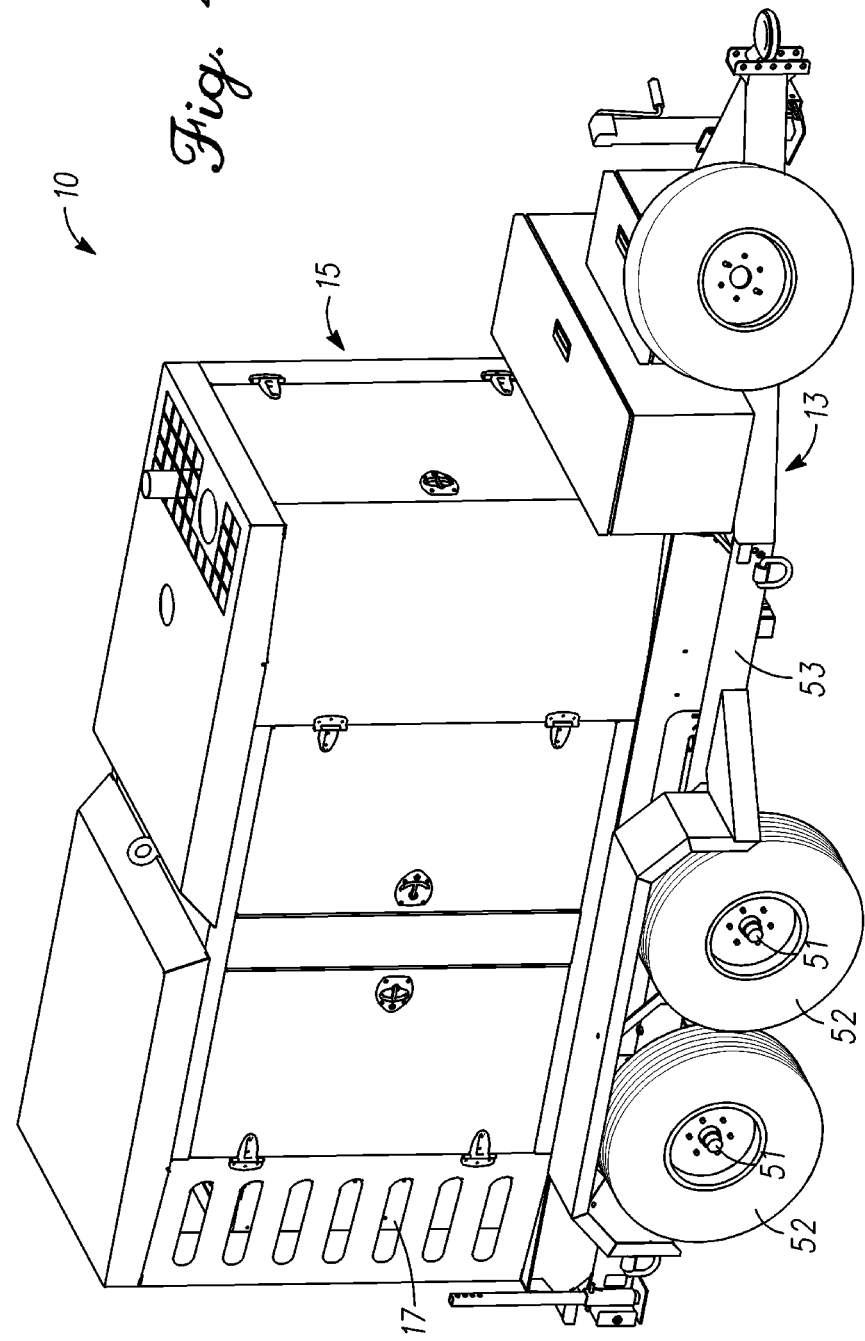
FIG. 4 is a perspective view illustrating the example towable power generation system shown in FIG. 1.
Figure 5:
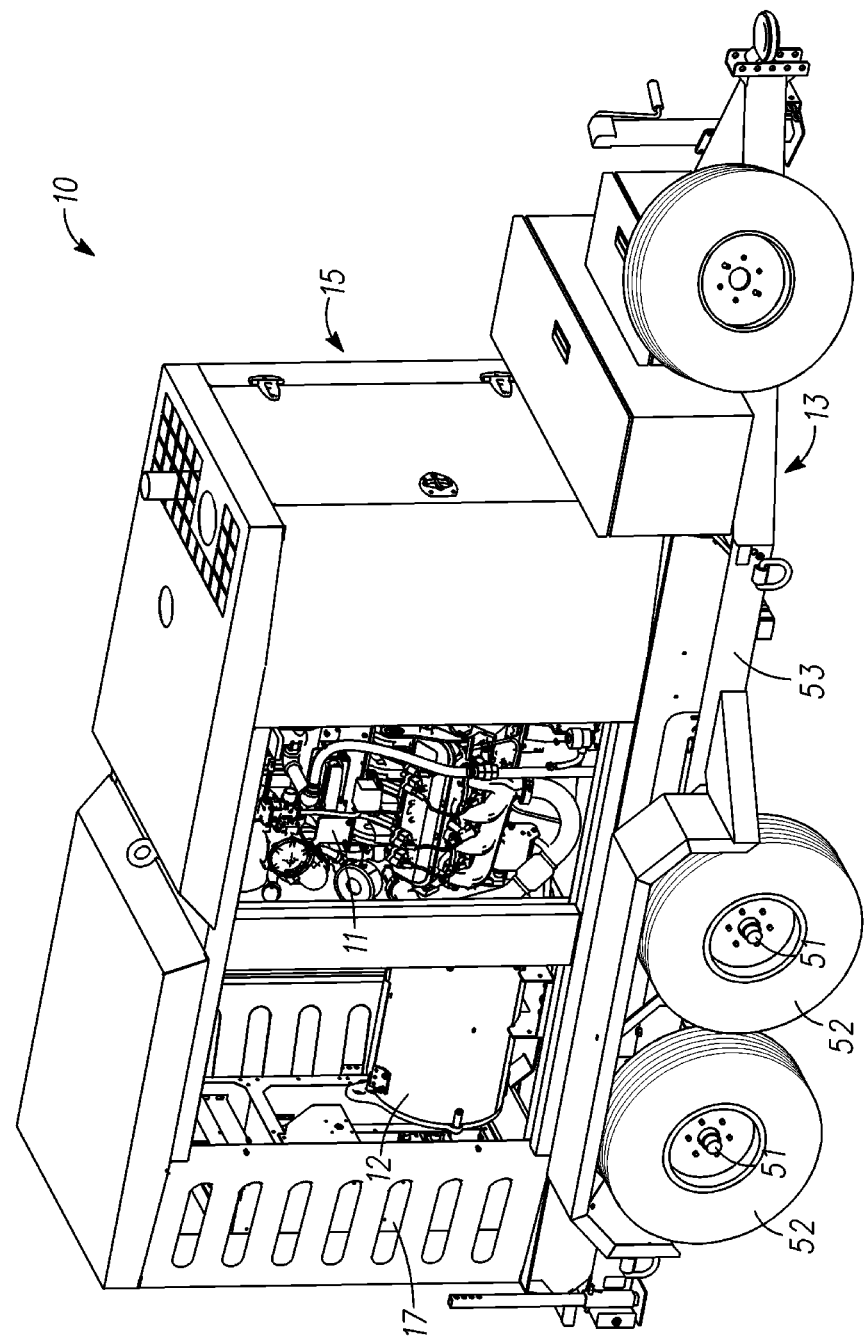
FIG. 5 is a perspective view of the example towable power generation system shown in FIG. 4 where the enclosure is opened to expose the components inside the enclosure.
Figure 6:
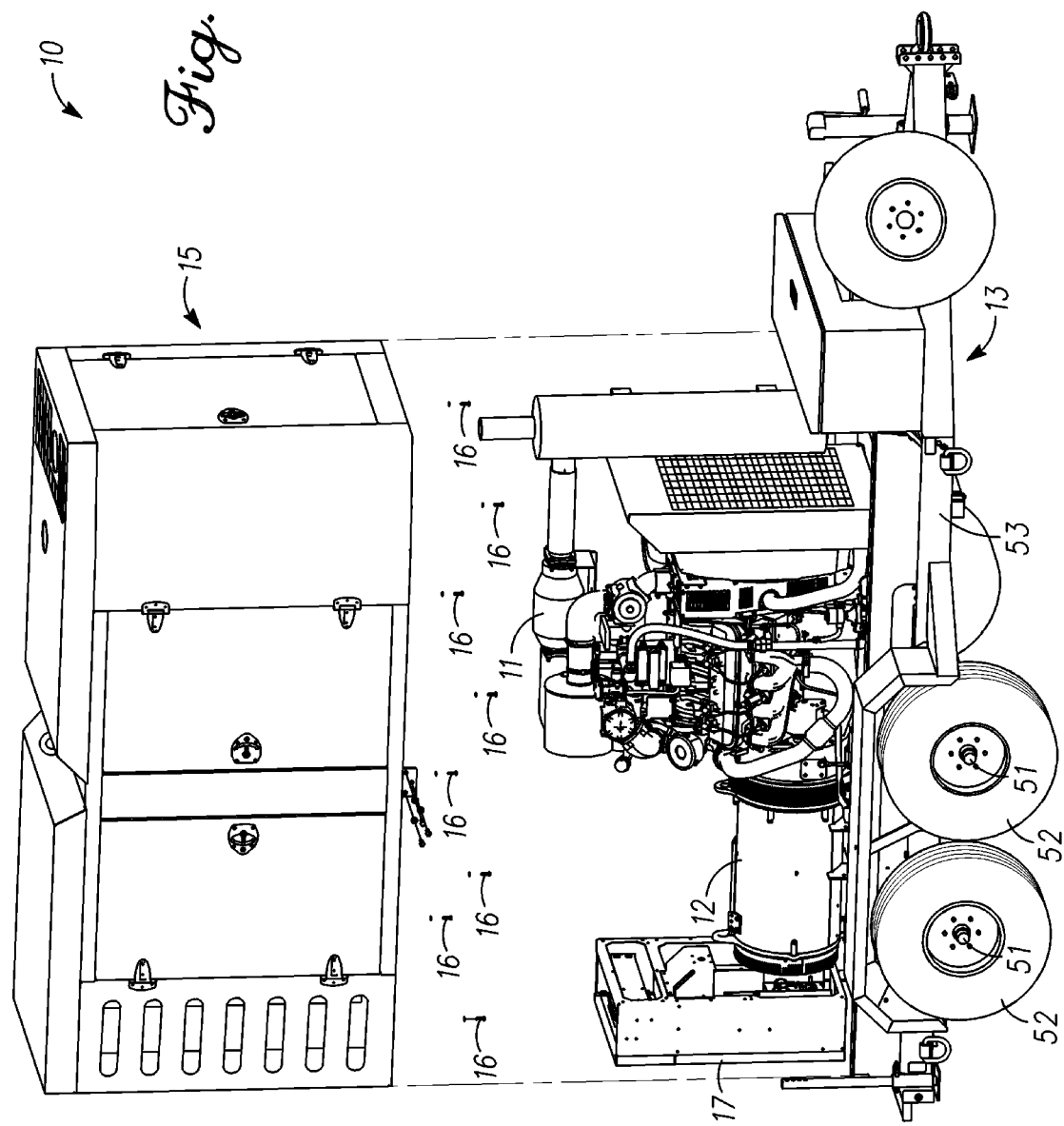
FIG. 6 is an exploded perspective view of the example towable power generation system shown in FIG. 4.
Figure 7:
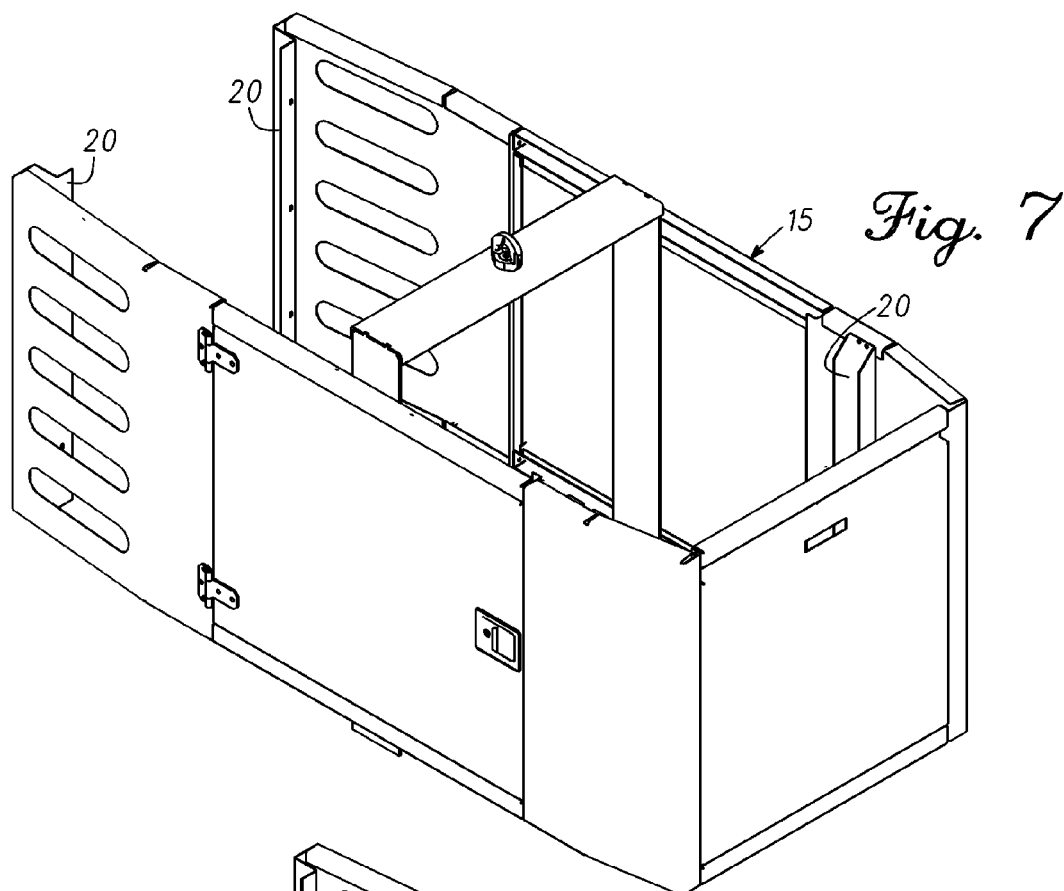
FIG. 7 illustrates an example embodiment of the towable power generation system of FIG. 1 where a guide is attached to an enclosure and is configured to engage a radiator of the internal combustion engine.
Figure 8:
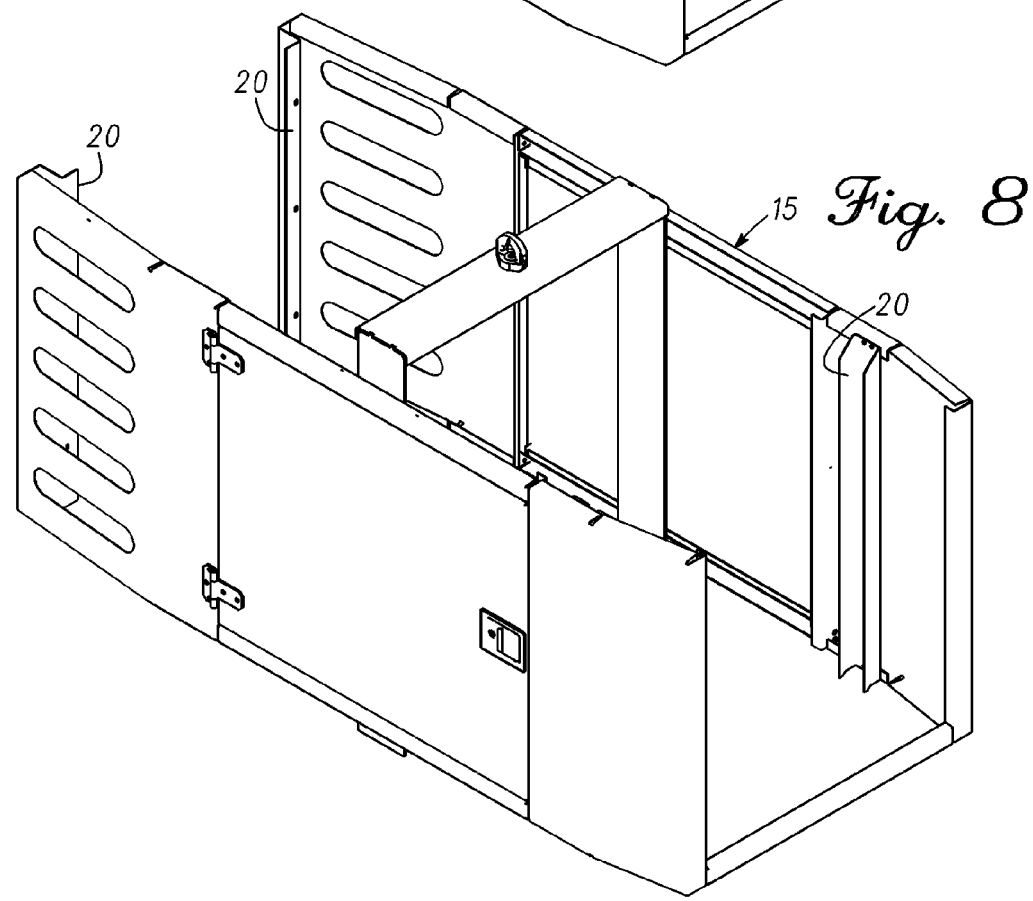
FIG. 8 illustrates the example embodiment of the towable power generation system of FIG. 7 where a front panel is removed to further illustrate the guide.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Existing towable generators include enclosures that house the internal combustion engine and the electrical alternator. The enclosures may be difficult to install and/or remove from the rest of the towable generator. Installing and/or removing such enclosures may be cumbersome because it can be difficult to maintain alignment of the enclosure relative to the rest of the towable generator during installation and/or removal of the enclosure.

FIGS. 1-6 illustrate an example towable power generation system 10. The towable power generation system 10 includes an internal combustion engine 11 (see FIGS. 2, 3, 5 and 6) and an alternator 12 (see FIGS. 2, 3, 5 and 6) driven by the internal combustion engine 11 to generate electrical power.

The towable power generation system 10 further includes a trailer 13 configured to be attached to a vehicle (not shown) that is adapted to tow the trailer 13. A base 14 (e.g., a skid) is attached to the trailer 13 such that the internal combustion engine 11 and the alternator 12 are mounted on the base 14. In the illustrated example embodiments, the trailer 13 includes one or more axles 51, wheels 52, a frame 53 and a tongue 54 for attaching the trailer 50 to a towing vehicle.

An enclosure 15 houses the internal combustion engine 11 and the alternator 12. The enclosure 15 is detachably connected to the base 14 using fasteners such that when the fasteners are removed the enclosure 15 is removed from the base 14.

It should be noted that the enclosure 15 may be formed as one-piece, or be formed of multiple components that are secured together to form a single enclosure. It should be noted that embodiments are contemplated where the enclosure 15 is removed from the base as one piece.

In the illustrated example embodiments, the fasteners are bolts that are removed to permit removal of the enclosure 15 from the base 14. It should be noted while the illustrated example embodiments illustrate the fasteners as being bolts, any type of fastener (or combination of fasteners) that is known now or discovered in the future may be utilized in the towable power generation system 10 including, but not limited to, clamps, snaps, screws and rivets (among others).

As shown in FIGS. 7-19, the towable power generation system 10 further includes a guide 20 that facilitates mounting the enclosure 15 onto the base 14. In the example embodiment that is illustrated on FIGS. 7-11, the guide 20 is attached to the enclosure 15. When enclosure 15 is mounted on the towable power generation system 10, the guide 20 on the enclosure 15 engages another portion of the towable power generation system 10 as the enclosure 15 is assembled onto (or removed from) the rest of towable power generation system 10. The guide 20 facilitates alignment and mounting of the enclosure 15 relative to the towable power generation system 10.

Figure 9:
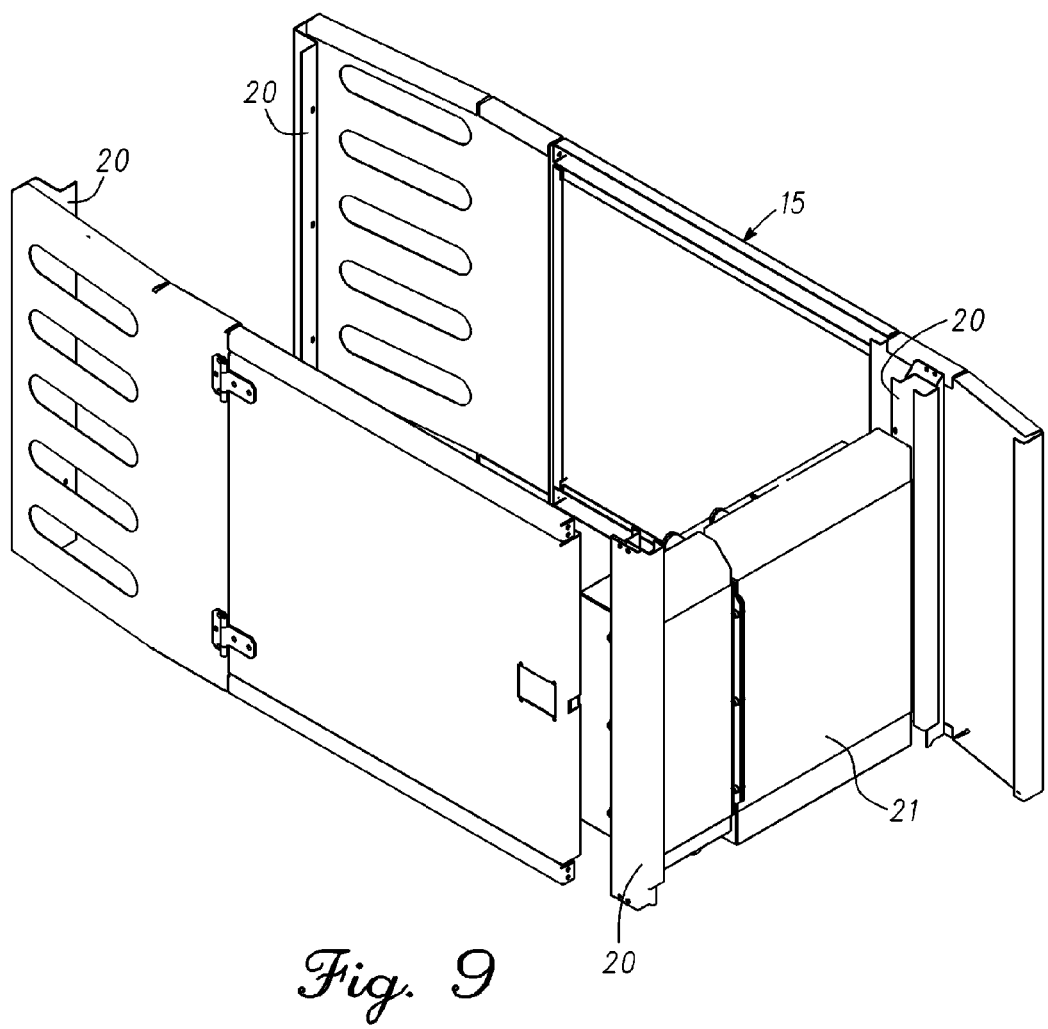
FIG. 9 illustrates the towable power generation system of FIGS. 7 and 8 where the guide on the enclosure engages a radiator that forms part of the towable power generation system.
Figure 10:
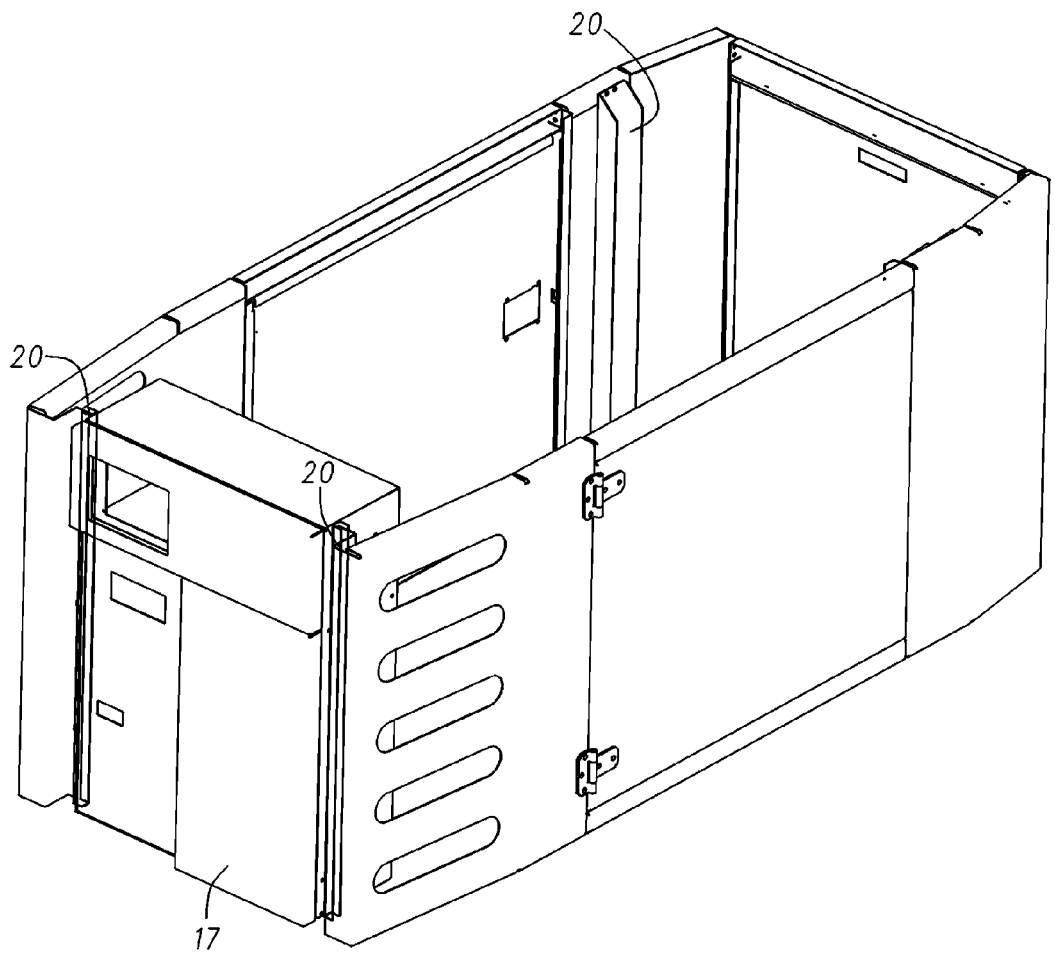
FIG. 10 illustrates another example embodiment of the towable power generation system where the guide on the enclosure engages a control of the towable power generation system.
Figure 11:
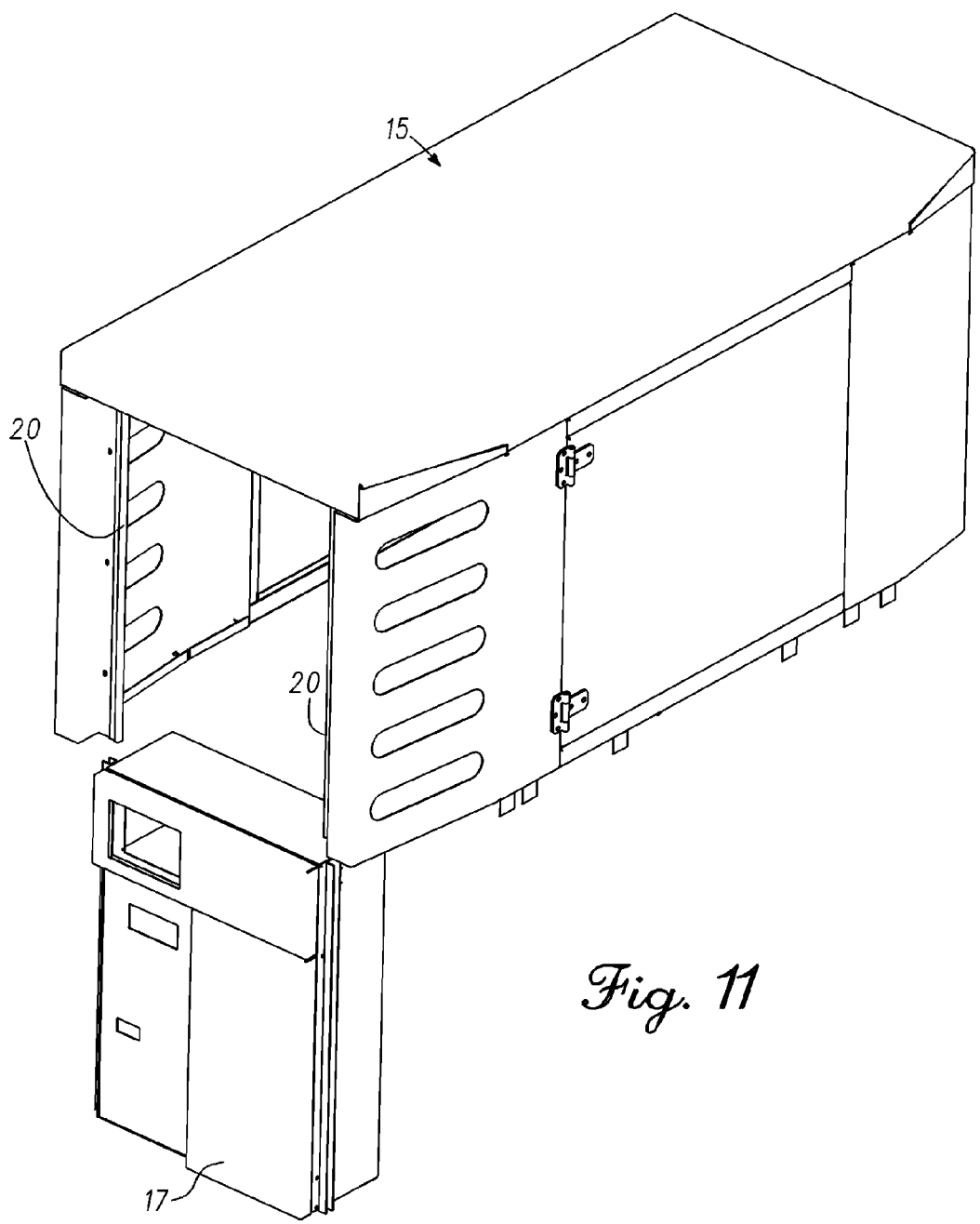
FIG. 11 illustrates the towable power generation system of FIG. 10 where the enclosure is partially assembled onto the towable power generation system.
Figure 12:
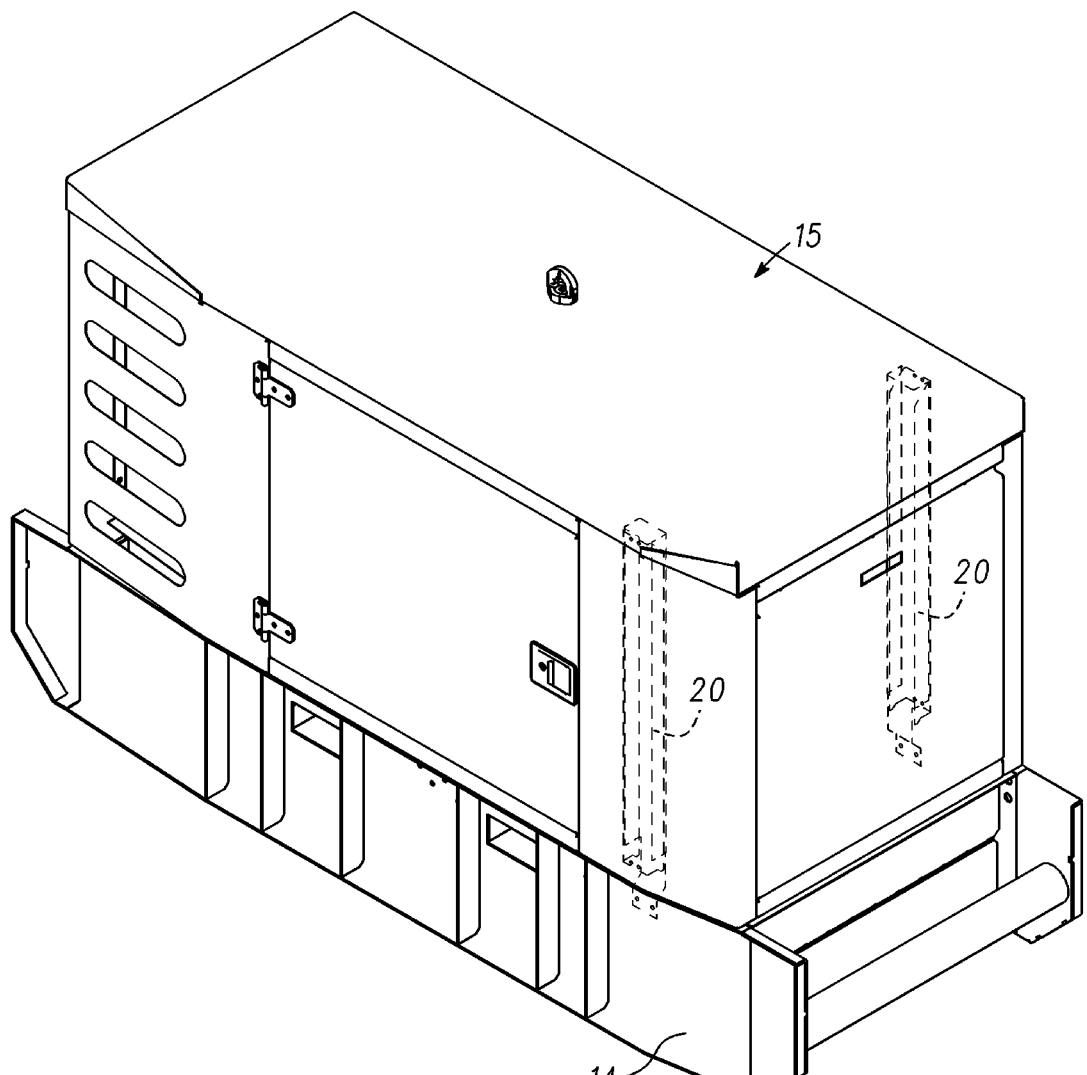
FIG. 12 illustrates another example embodiment of the towable power generation system where the guide is attached to the base and engages only the enclosure.
Figure 13:
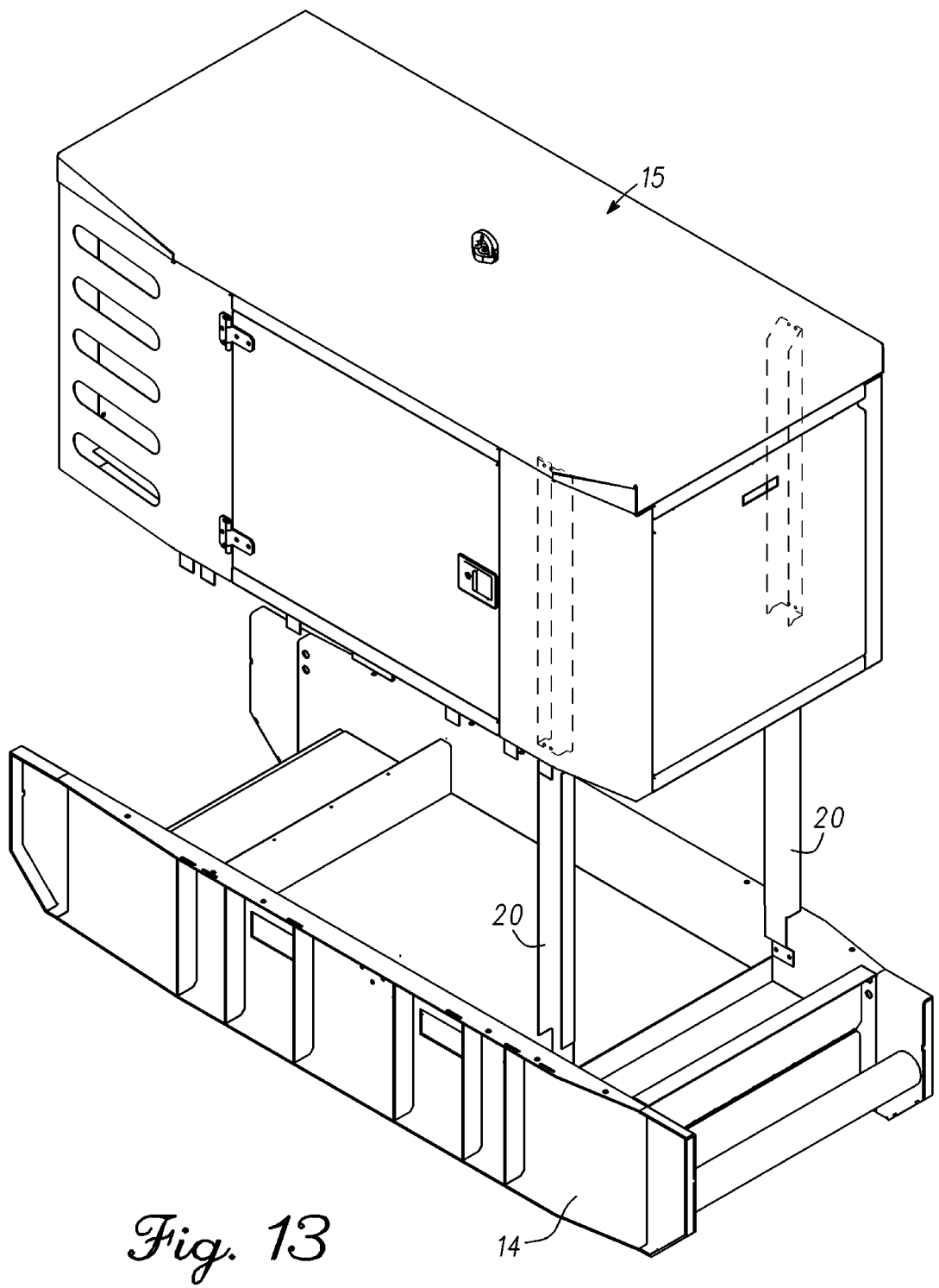
FIG. 13 illustrates the towable power generation system of FIG. 12 where the enclosure is partially assembled to the towable power generation system.
Figure 14:
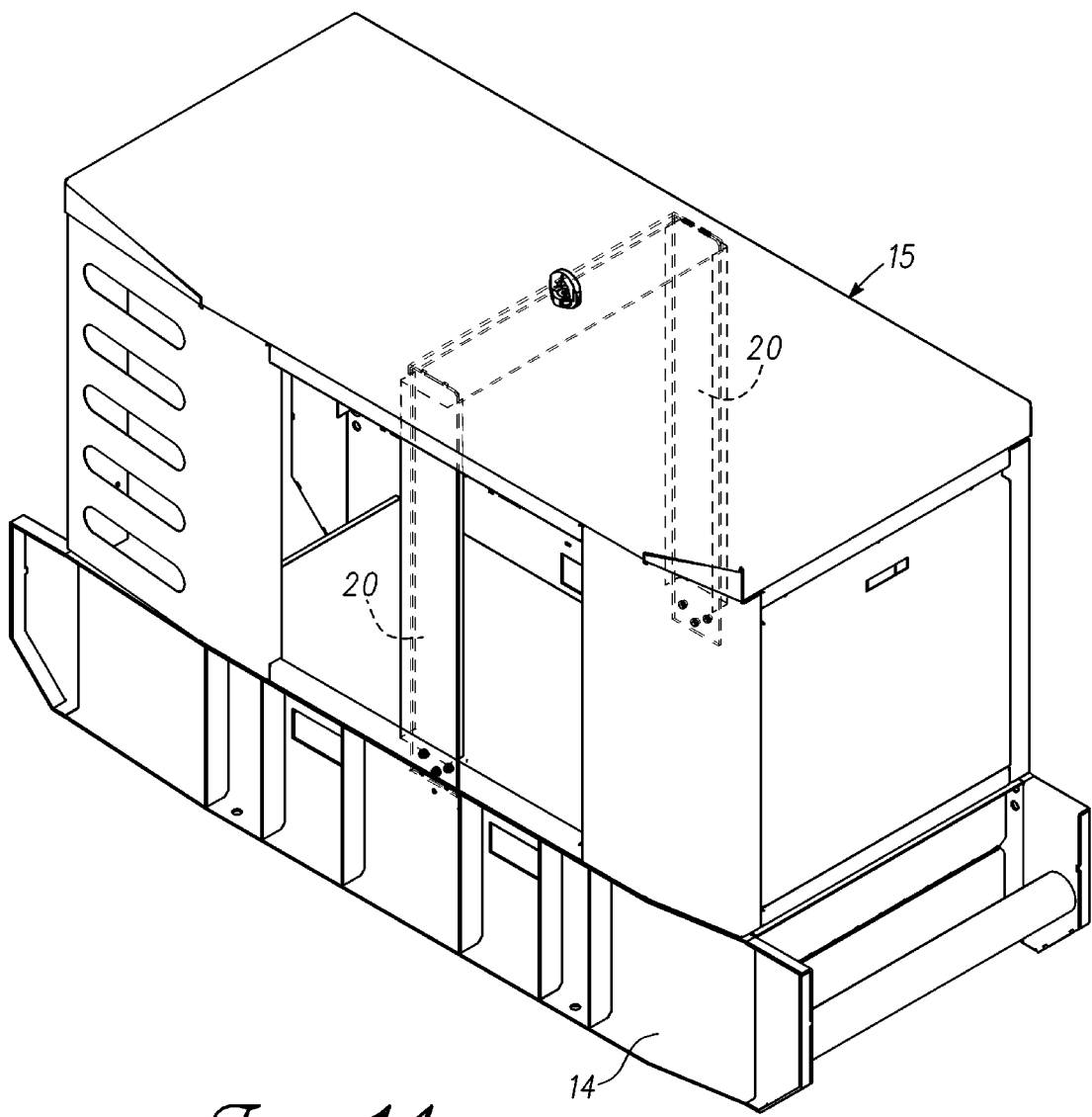
FIG. 14 illustrates another example embodiment of the towable power generation system where the guide is attached to the base and engages only the enclosure.
Figure 15:
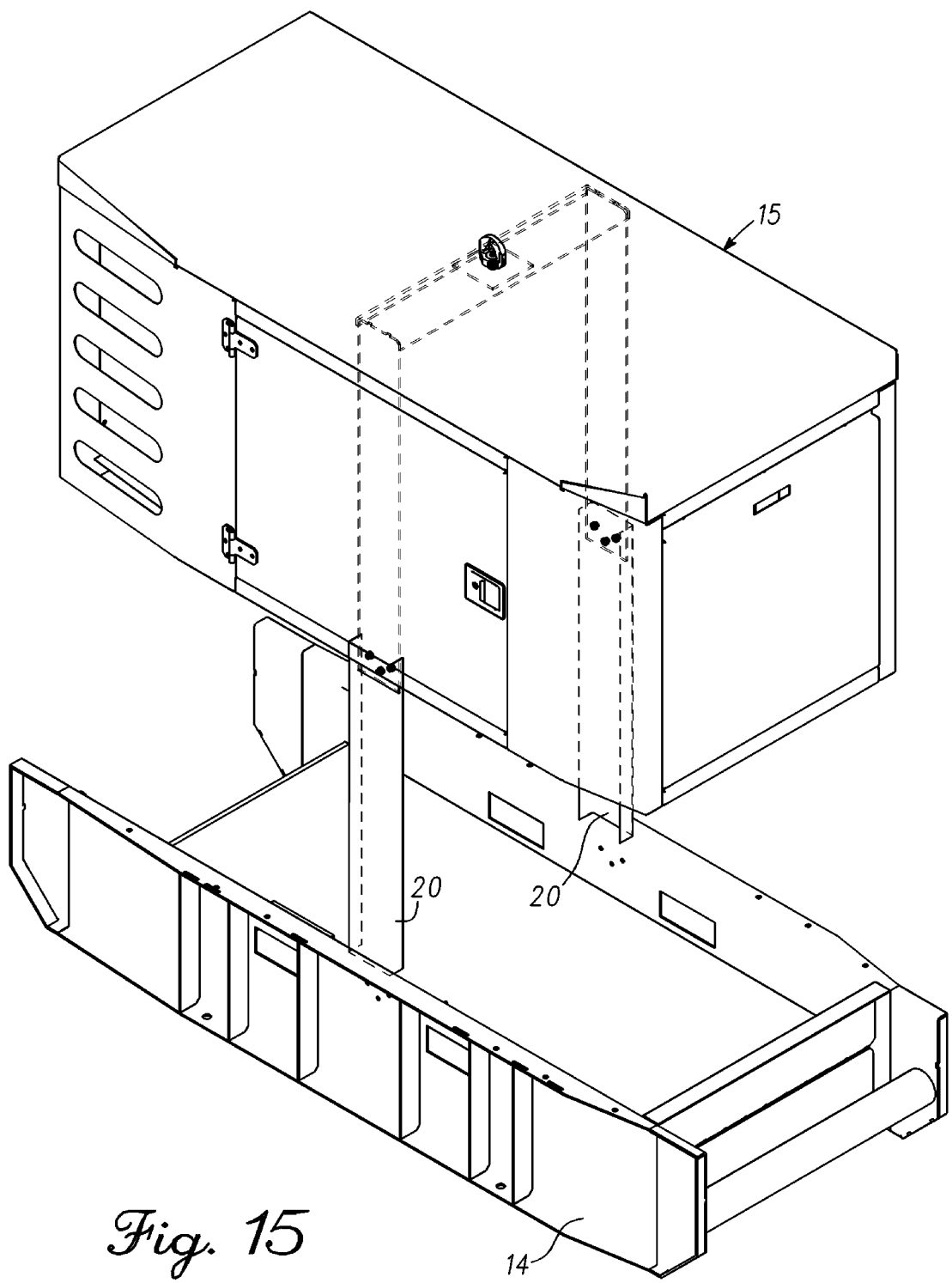
FIG. 15 illustrates the towable power generation system of FIG. 14 where the enclosure is partially assembled to the towable power generation system.

FIG. 9 illustrates an example embodiment of the towable power generation system 10 where the guide 20 on the enclosure 15 engages a radiator 21 of the internal combustion engine 11. FIGS. 10-11 illustrate another example embodiment of the towable power generation system 10 where the guide 20 on the enclosure 15 engages a control panel 17 that operates the towable power generation system. It should be noted that the guide 20 on the enclosure 15 may engage other parts of the towable power generation system 10 (e.g., the base 14).

In the example embodiment that is illustrated in FIGS. 12-17, the guide 20 is attached to the base 14 such that when the enclosure 15 is mounted on the towable power generation system 10, the guide 20 on the base 14 engages the enclosure 15. The guide 20 facilitates alignment and mounting of the enclosure 15 relative to the base 14 of the towable power generation system 10.

Figure 16:
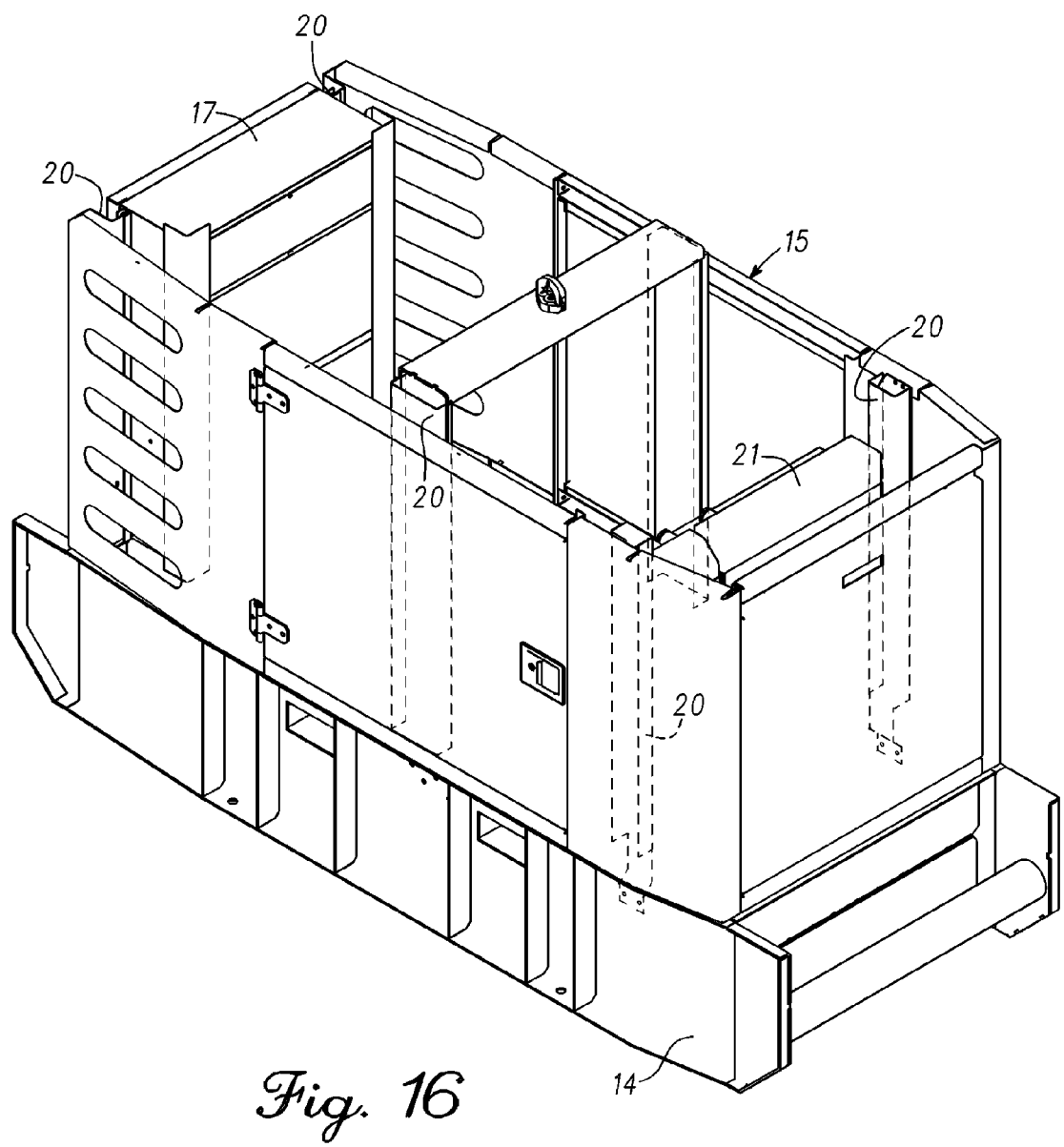
FIG. 16 illustrates another example embodiment of the towable power generation system where the guide on the base engages the enclosure and a radiator of the internal combustion engine.
Figure 17:
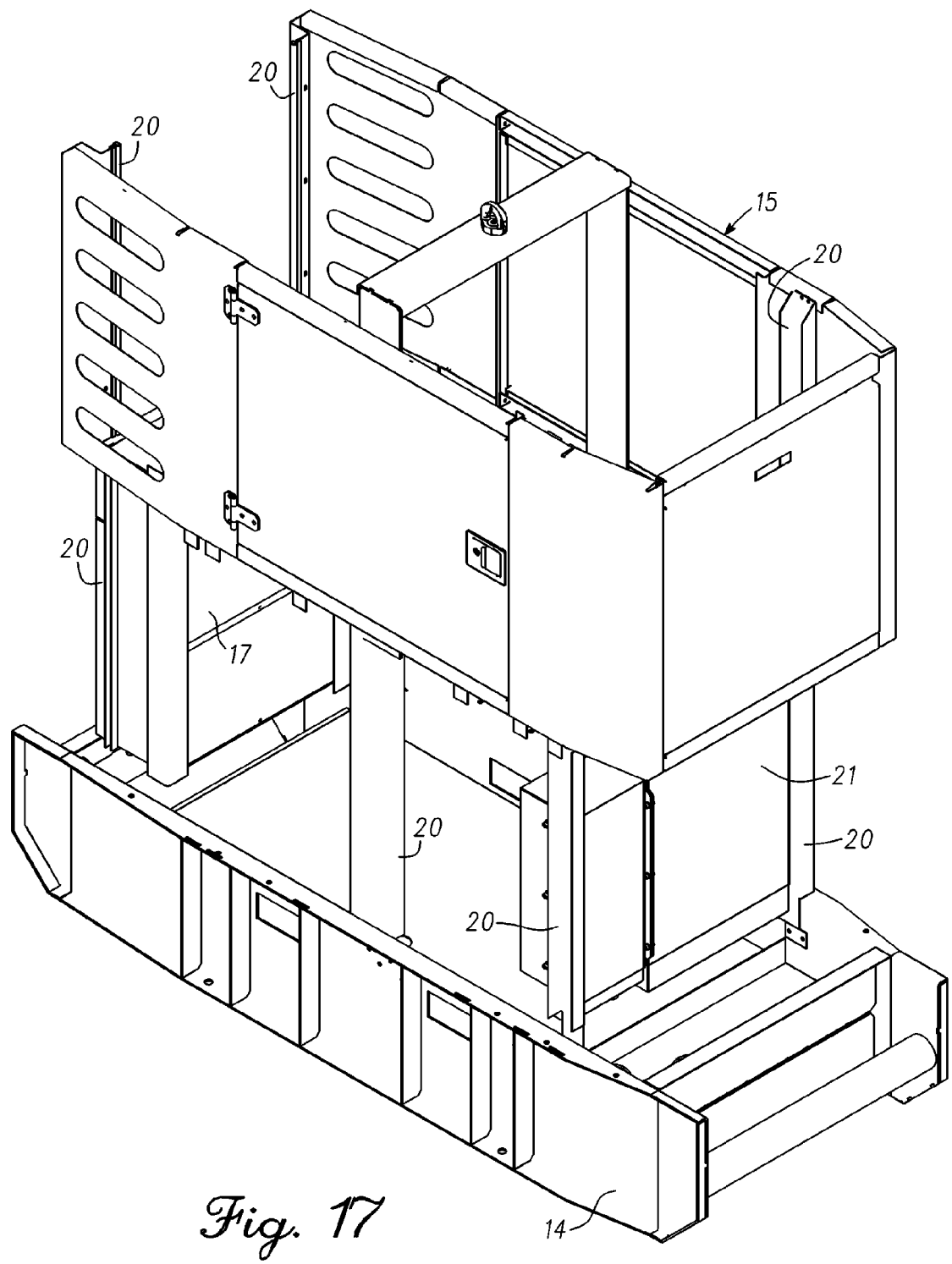
FIG. 17 illustrates the towable power generation system of FIG. 16 where the enclosure is partially assembled to the towable power generation system.

FIGS. 12-15 illustrate example embodiments of the towable power generation system 10 where the guides 20 on the base 14 engage only the enclosure 15. FIGS. 16-17 illustrate an example embodiment of the towable power generation system 10 where the guides 20 on the base 14 engage the enclosure 15 and (i) a radiator 21 of the internal combustion engine 11; and (ii) a control panel 17 that operates the towable power generation system 10. It should be noted that the guide 20 on the base 14 may engage other parts of the towable power generation system 10 and any part of the enclosure 15.

In some of the illustrated embodiments, the guide 20 is attached to a portion of the towable power generation system 10 such that when the enclosure 15 is mounted on the towable power generation system 10, the guide 20 engages the enclosure 15. The guide 20 facilitates alignment and mounting of the enclosure 15 relative to the towable power generation system 10.

FIG. 16 illustrates an example embodiment of the towable power generation system 10 where the guide 20 is attached to a portion of the internal combustion engine (e.g., the radiator 21) and engages the enclosure 15. FIG. 17 illustrates another example embodiment of the towable power generation system 10 where the guide 20 is attached a control panel 17 that operates the towable power generation system and engages the enclosure 15. It should be noted that the guide 20 may be on other portions of the power generation system and may engage the base 14.

Figure 18:
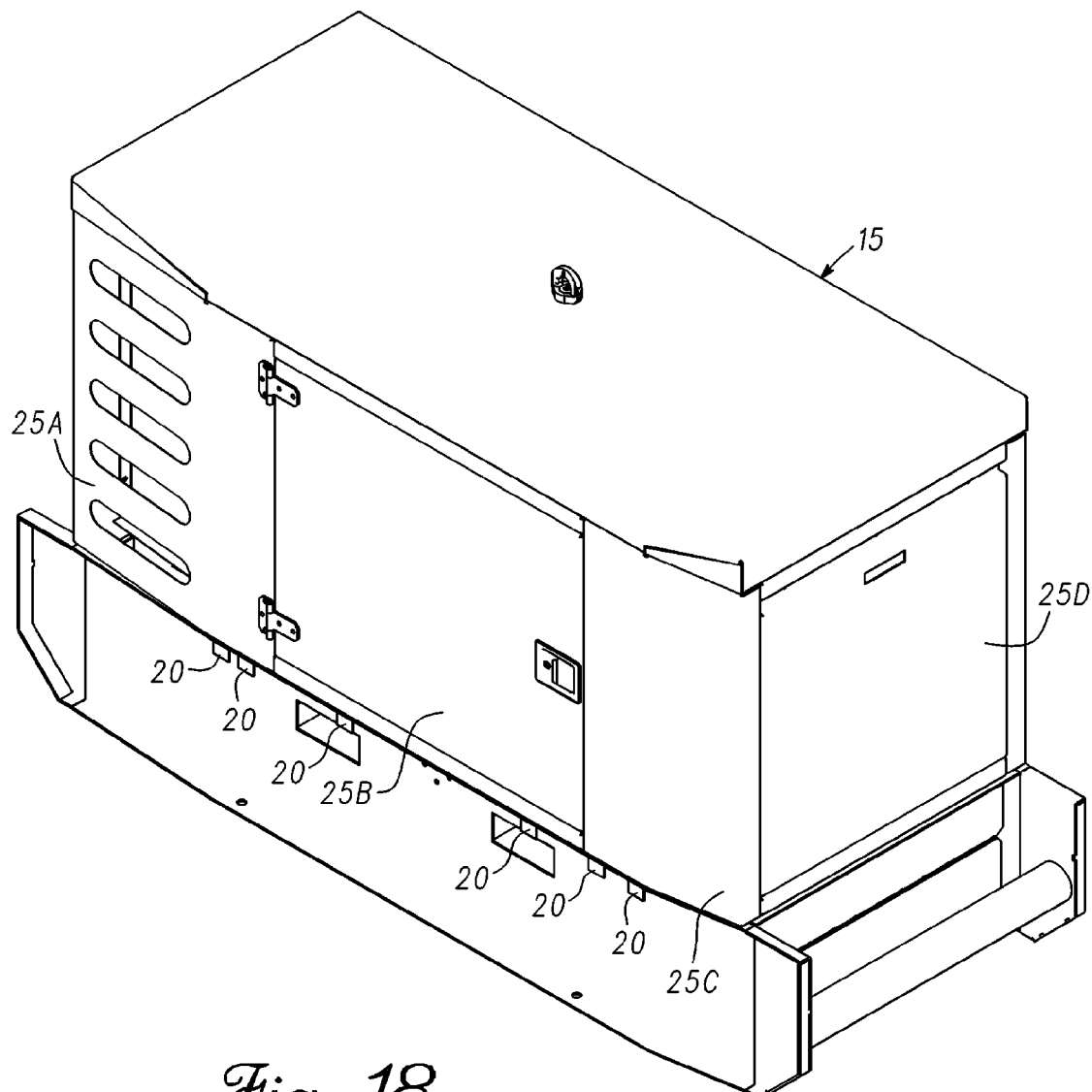
FIG. 18 illustrates an example embodiment of the towable power generation system where the towable power generation system further includes a plurality of guides that are configured to fit a particular component that forms the enclosure.
Figure 19:
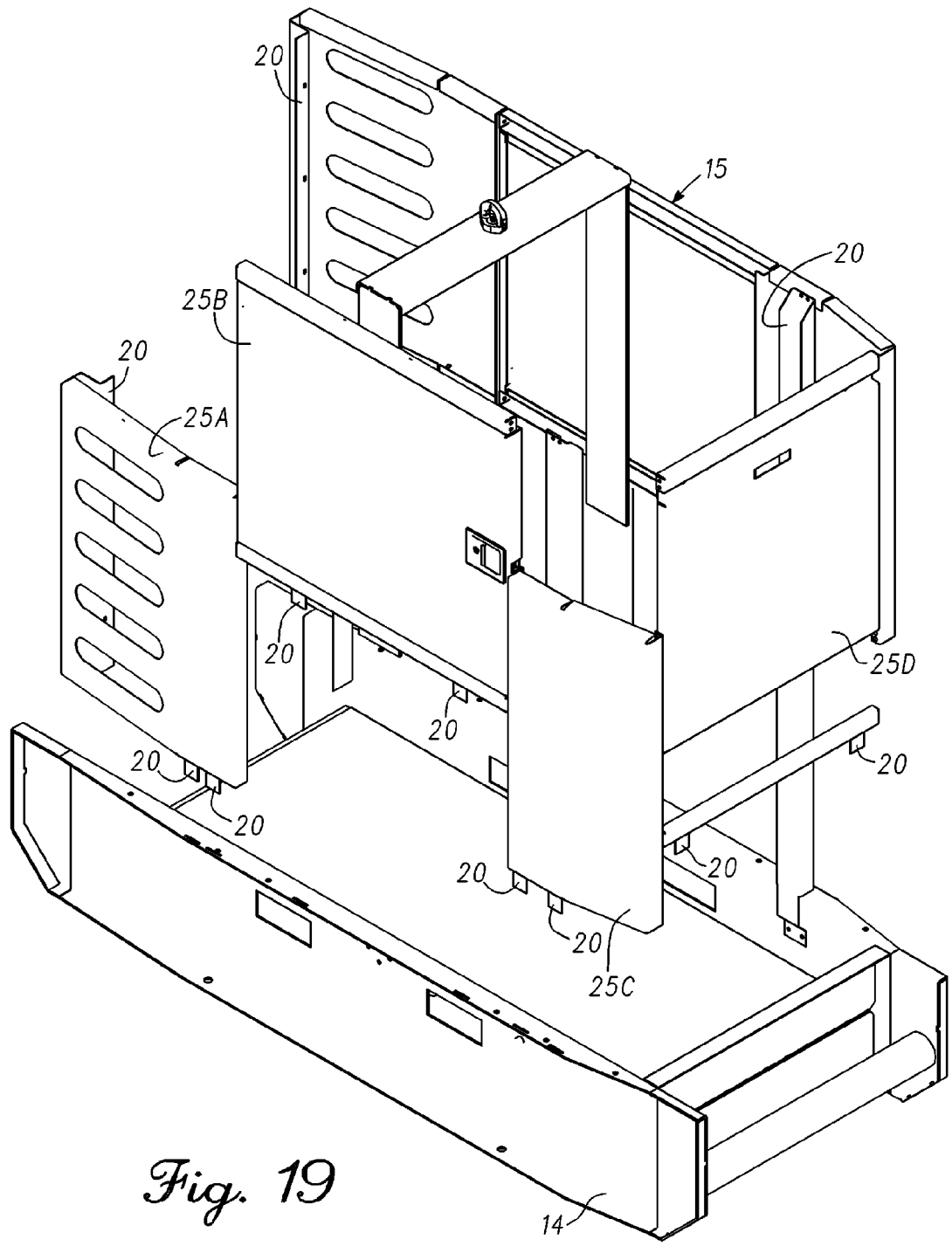
FIG. 19 illustrates the towable power generation system of FIG. 18 where the enclosure is partially assembled to the towable power generation system.

As shown in FIGS. 18-19, the towable power generation system 10 may further include a plurality of guides 20. In addition, the enclosure 15 may be formed of multiple components 25A, 25B, 25C 25D such that each guide 20 in the plurality of guides 20 facilitates mounting at least one of the components 25A, 25B, 25C 25D that form the enclosure 15 onto the base 14.

As an example, each guide 20 in the plurality of guides 20 may be configured to fit a particular one of the multiple components 25A, 25B, 25C 25D that form the enclosure 15. Configuring each guide 20 to fit a particular one of the multiple components 25A, 25B, 25C 25D allows the components 25A, 25B, 25C 25D to be inserted separately and correctly onto the base 14. The guides 20 may be designed to fit a particular one of the multiple components 25A, 25B, 25C 25D by the size, location and/or shape of the guides 20 relative to whatever the guide 20 is secured to when mounting the components that form the enclosure 15 onto the base 14 (or another portion of the towable power generation system 10).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A towable power generation system comprising:
   an internal combustion engine;
   an alternator driven by the internal combustion engine to generate electrical power;
   a trailer configured to be attached to a vehicle that is adapted to tow the trailer;
   a base attached to the trailer such that the internal combustion engine and the alternator are mounted on the base;
   an enclosure that houses the internal combustion engine and the alternator;
   a straight guide that facilitates linearly mounting the enclosure onto the base;
   wherein the guide is attached to the enclosure; and
   wherein the guide engages another portion of the towable power generation system.

2. The towable power generation system of claim 1, wherein the another portion that the guide engages is a radiator.

3. The towable power generation system of claim 1, wherein the another portion that the guide engages is a control panel that operates the towable power generation system.

4. The towable power generation system of claim 1, wherein the another portion that the guide engages is the base.

5. The towable power generation system of claim 1, further comprising a plurality of guides, and wherein the enclosure is formed of multiple components that are secured together to form a single enclosure such that the plurality of guides facilitates mounting the single enclosure onto the base.

6. The towable power generation system of claim 1, wherein the trailer includes at least one axle, at least one pair of wheels, a frame and a tongue adapted to attach the trailer to a moving vehicle.

7. A towable power generation system comprising:
   an internal combustion engine;
   an alternator driven by the internal combustion engine to generate electrical power;
   a trailer configured to be attached to a vehicle that is adapted to tow the trailer;
   a base attached to the trailer such that the internal combustion engine and the alternator are mounted on the base;
   an enclosure that houses the internal combustion engine and the alternator;

a straight guide that facilitates linearly mounting the enclosure onto the base;

wherein the guide is attached to the base; and wherein the guide engages another portion of the towable power generation system.

8. The towable power generation system of claim 7, wherein the another portion that the guide engages is a radiator.

9. The towable power generation system of claim 7, wherein the another portion that the guide engages is a control panel that operates the towable power generation system.

10. The towable power generation system of claim 7, wherein the another portion that the guide engages is the enclosure.

11. The towable power generation system of claim 7, wherein the trailer includes at least one axle, at least one pair of wheels, a frame and a tongue adapted to attach the trailer to a moving vehicle.

12. The towable power generation system of claim 7, further comprising a plurality of guides, and wherein the enclosure is formed of multiple components that are secured together to form a single enclosure such that the plurality of guides facilitates mounting the single enclosure onto the base.

13. A towable power generation system comprising:
an internal combustion engine;
an alternator driven by the internal combustion engine to generate electrical power;
a trailer configured to be attached to a vehicle that is adapted to tow the trailer;
a base attached to the trailer such that the internal combustion engine and the alternator are mounted on the base;
an enclosure that houses the internal combustion engine and the alternator;
a straight guide that facilitates linearly mounting the enclosure onto the base;
wherein the guide engages the enclosure; and
wherein the guide is attached to at least one of a portion of the internal combustion engine, a portion of the alternator, a radiator, and a control panel that operates the towable power generation system.

14. The towable power generation system of claim 13, wherein the trailer includes at least one axle, at least one pair of wheels, a frame and a tongue adapted to attach the trailer to a moving vehicle.

15. The towable power generation system of claim 13, further comprising a plurality of guides, and wherein the enclosure is formed of multiple components that are secured together to form a single enclosure such that the plurality of guides facilitates mounting the single enclosure onto the base.

16. A towable power generation system comprising:
an internal combustion engine;
an alternator driven by the internal combustion engine to generate electrical power;
a trailer configured to be attached to a vehicle that is adapted to tow the trailer;
a base attached to the trailer such that the internal combustion engine and the alternator are mounted on the base;
an enclosure that houses the internal combustion engine and the alternator;
a plurality of guides, and wherein the enclosure is formed of multiple components that are secured together to form a single enclosure such that the plurality of guides facilitates mounting the single enclosure onto the base; and
wherein each guide in the plurality of guides fits a specific component of the multiple components that form the enclosure to ensure proper placement of each of the multiple components that form the enclosure relative to the base of the power the power generation system.

17. The towable power generation system of claim 16, wherein the trailer includes at least one axle, at least one pair of wheels, a frame and a tongue adapted to attach the trailer to a moving vehicle.

* * * * *